United States Patent

Brunet et al.

[11] Patent Number: 5,410,131
[45] Date of Patent: Apr. 25, 1995

[54] WELDING CONNECTION ASSEMBLY FOR HEAT-FUSING PLASTIC TUBES

[75] Inventors: Martine Brunet, Groslay; Denis Dufour, Franconville, both of France

[73] Assignee: Gaz de France, Paris, France

[21] Appl. No.: 43,867

[22] Filed: Apr. 7, 1993

[30] Foreign Application Priority Data

Apr. 10, 1992 [FR] France .................. 92 04415

[51] Int. Cl.6 ............... B29C 65/34; B29C 65/30
[52] U.S. Cl. .................. 219/535; 156/304.6
[58] Field of Search ............ 156/273.9, 274.2, 158, 156/304.2, 503, 304.6; 219/535, 544, 547; 285/21, 22, 43, 286, 292

[56] References Cited

U.S. PATENT DOCUMENTS

| | | | |
|---|---|---|---|
| 2,930,634 | 3/1960 | Merritt | 156/274.2 |
| 4,864,417 | 8/1987 | Grandclement | 156/158 |
| 4,933,037 | 6/1990 | de Jong | 156/274.2 |
| 5,141,580 | 8/1992 | Dufour et al. | 156/158 |
| 5,169,176 | 12/1992 | Brossard | 285/21 |
| 5,223,189 | 6/1993 | Friedrich | 156/304.2 |

FOREIGN PATENT DOCUMENTS

| | | |
|---|---|---|
| 3939570 | 6/1991 | Germany . |
| 4-140593 | 5/1992 | Japan ................... 285/21 |

OTHER PUBLICATIONS

Patent Abstracts of Japan, vol. 15, No. 232, JP-A-3071824, Jun. 1991.
Patent Abstracts of Japan, vol. 15, No. 6, JP-A-2256997, Jan. 1991.
Database WPIL, section Ch, week 8437, GB-A-2136074, Sep. 1984.
Database WPIL, section Ch, week 8525, EP-A-145581, Jun. 1985.
Database WPIL, section Ch, week 9011, JP-A-2030516, Jan. 1990.
Database WPIL, section Ch, Week 8545, EP-A-160536, Nov. 1985.
Database WPIL, Section Ch, week 8440, GB-A-2137297.
Database WPIL, Section Ch, week 8625, EP-A-184658.
Database WPIL, Section Ch, week 8607, EP-A-170844.
Database WPIL, Section Ch, week 8303, EP-A-69020.

*Primary Examiner*—Geoffrey S. Evans
*Attorney, Agent, or Firm*—Pollock, Vande Sande & Priddy

[57] ABSTRACT

An interlaced meshed resistance network having one or more continuous wire conductors is formed from a tubular wire network cylinder folded over itself in order to have a double thickness into a flat annular ring shape. The resistance network can be used to bond heat fusing plastic tubes together. The wire is covered with a layer of material which is thermally conducting and electrically insulating up to a temperature about 300 to 350 degrees Celsius.

11 Claims, 3 Drawing Sheets

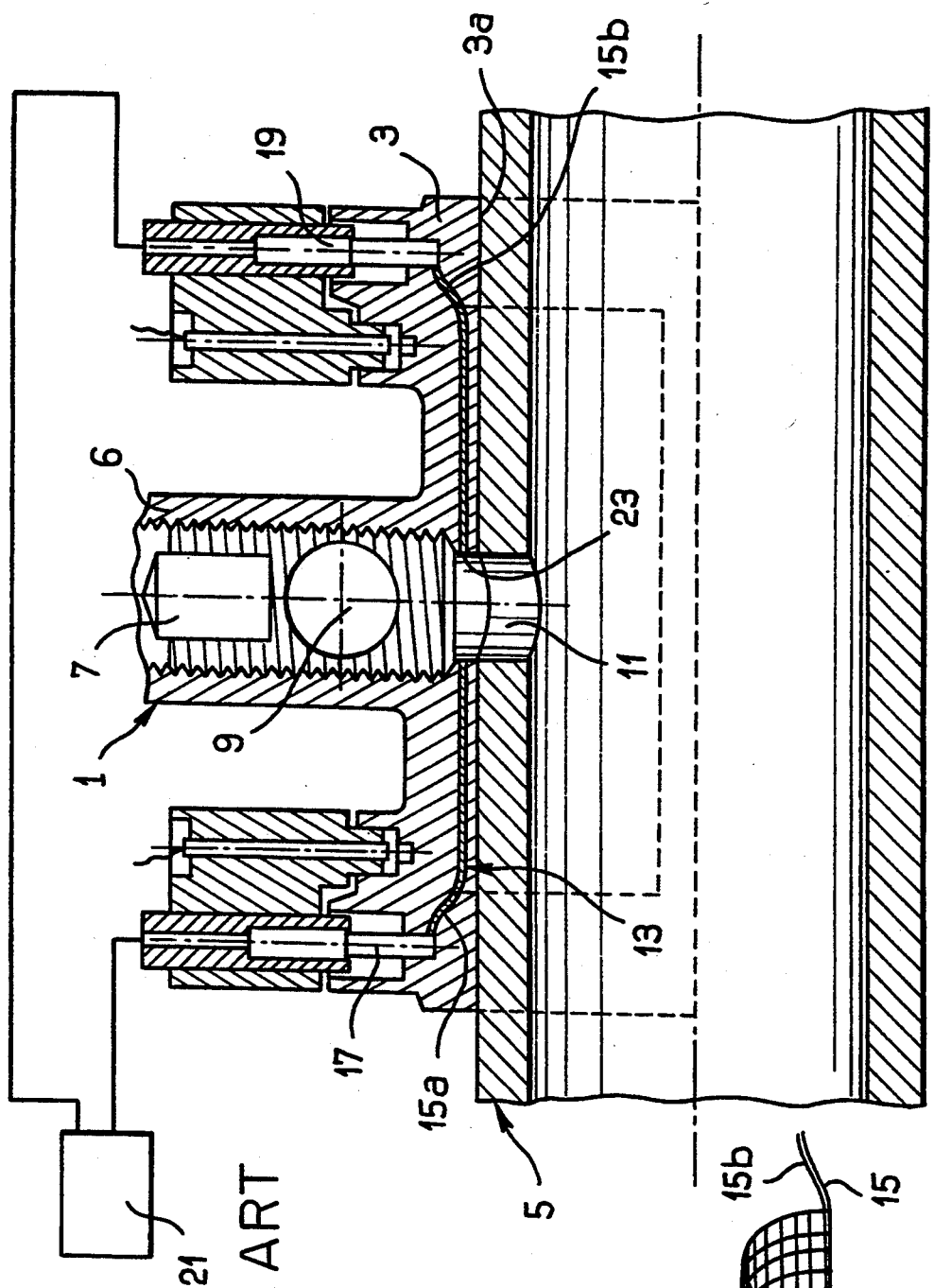
FIG_1 PRIOR ART
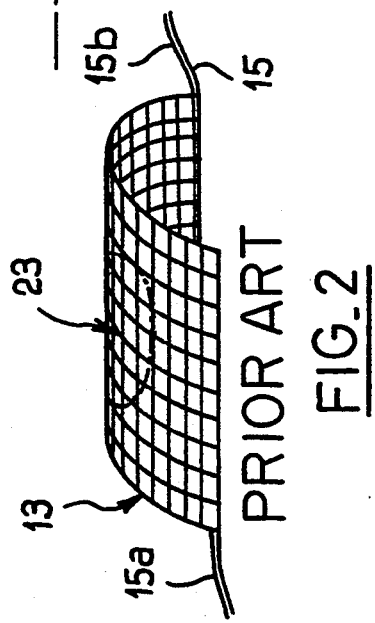
FIG_2 PRIOR ART

WELDING CONNECTION ASSEMBLY FOR HEAT-FUSING PLASTIC TUBES

FIELD OF THE INVENTION

The invention relates in a general manner to the production of electrical resistances used for the welding together, or more particularly electric welding together, of elements, and most particularly of plastic or thermoplastic elements.

BACKGROUND OF THE INVENTION

In the art, and in particular from FR-A-2,654,978, it is already known to be possible to use, in this field, resistances in the form of a meshed network making up an electrically-conducting net extending, with electrical continuity, from one end of this net to an opposite end.

In order to carry out the welding, the net is placed in the location of the welding zone of the elements, and is connected via connection terminals to an electrical power source intended to cause to flow, in the resistance, a current of sufficient strength to raise the temperature of the surrounding part of these elements up to a predetermined temperature corresponding to their melting point, thus ensuring their cohesion under pressure and then their welding, after stopping of the current supply and cooling.

In the abovementioned publication FR-A-2,654,978, the resistive net is most particularly intended for the electric welding of thermoplastic tubes which are used in the gas industry and are joined by a connection element made from compatible material, whether a sleeve for joining two coaxial main pipes or a junction saddle (also called branch connector) for transverse taps or branch-offs, for example those in the form of a "T".

The welded connection of two coaxial main pipes by means of a heating-net sleeve poses virtually no problem in principle, it being possible for the said net in particular to be presented as a length of a cylinder embedded close to the inner surface wall of the sleeve, with its cylinder axis substantially coincident with that of the sleeve (which is normally also substantially cylindrical).

However, it has proved to be the case that further improvements can be made when the heating net equips a branch connector for the transverse connection of a main pipe to another pipe.

In order for the problem posed to be well understood, let us briefly recall the possible make-up of such a "connector", two embodiments of which may be found: in the abovementioned publication and, for example, in U.S. Pat. No. 4,684,417.

Normally, these connectors, generally made of thermoplastic material, comprise a saddle-shaped part or body straddling quite closely the main pipe from which the transverse tap is to be effected.

On the convex outer surface side of the saddle there stands up a shaft which is penetrated, as is the body of the connector, by a passageway which itself can be connected to a transverse branch channel.

Once the branch connector is welded on above the length of pipe, the wall of the latter is pierced, by means of a sealer-perforator moving in the passageway of the shaft, after which the perforator is withdrawn or raised in the said passageway, beyond its communication with the branch channel on which the connection pipe may have been preinstalled, which pipe may thus communicate with the main pipe via the transverse piercing which has been made.

In fact, a problem may arise during the piercing or after this in the case where a heating net has been used to heat fuse the connector and the main pipe, as will be understood hereinbelow with reference to the attached FIGS. 1 and 2 which illustrate the prior art.

First of all, in FIG. 1, a branch connector 1 may thus be seen with its connection saddle 3 straddling a main pipe 5 in which provision may be made, for example, for a pressurized fluid, such as gas, to flow.

On the outside, above the saddle, there stands up the shaft 6 of the connector with its vertical inner passageway 7 at an intermediate level from which emerges the transverse branch channel 9 which communicates here with the inner volume of the main pipe via the piercing 11 which has been made in the wall of the latter by the sealer-perforator (not shown).

In order to produce the transverse piercing 11, the perforator has to pierce and penetrate the welding resistance 13, here embedded in the body of the saddle 3, in the immediate proximity of its concave inner surface which is substantially in the form of a portion of a cylinder, which portion is designated by 3a.

FIG. 2 illustrates, in solid lines, the substantially semi-cylindrical shape of the resistance 13, before action by the perforator.

It should thus be noted that this resistance is in the form of a meshed net having an electrically-conducting wire or wires 15 extending continuously between its two opposite ends 15a, 15b. For the welding of the saddle and the main pipe, these ends 15a, 15b are normally each connected to a connection terminal (such as 17, 19), which terminals are themselves connected to a power source, such as a direct-current generator, shown diagrammatically at 21 (and equipped, of course, with all the devices necessary for suitably supplying this resistance for the chosen period).

Thus, at the moment of welding, and until the perforator has acted, the resistive net 13 has no orifice penetrating it, this having the advantage that, at the moment of welding, it still has its electrical continuity between its wire ends 15a, 15b.

On the other hand, once the perforator has produced the piercing 11, the net then necessarily has a hole made along the axis of the perforator and of the piercing, such a hole having been shown diagrammatically at 23 and delimited by the dot-dash lines in FIG. 2.

The net thus no longer has its electrical continuity.

Moreover, it has been necessary to exert an additional force on the perforator in order to penetrate the net, with the risk of pulling certain sections of wire (wires), causing potential passageways for leaks.

Furthermore, it turned out that the operations for checking the tightness of the joints between the connectors and the main pipes were made more tricky because of the presence of a net portion along the axis of the passageway 7 via which the operator conducts some of these operations before piercing of the hole 11.

Still within the scope of the transverse connection, in particular of tubes, it has also already been proposed to use a plastic ring or collar integrating a resistance which is most often spiralled, but which may occasionally assume a corrugated configuration (see especially the publication JP-A-3,071,824 and JP-A-2,256,997).

However, even if by virtue of such a crown-shaped plastic element it is possible for the resistance to preserve electrical continuity, this solution necessitates manufacturing an additional element (the crown) with the corresponding steps for installing and monitoring the resistance which has to be embedded therein. Moreover, as a matter of fact, the additional cost will be even greater since it will be necessary to provide virtually as many crowns of different dimensions as there may be diameters of connection orifices to be pierced, or indeed of tube diameters.

BRIEF DESCRIPTION OF THE INVENTION

The invention aims to solve all these difficulties of the prior art by providing a solution which is inexpensive, applicable virtually to any type of connection and tube elements, irrespective of their diameters and those of the orifices to be pierced and irrespective of whether the joining is effected end to end or transversely, by continuously ensuring an electrical continuity throughout the resistance and a very good heating uniformity around its embedding position.

SUMMARY OF THE INVENTION

This is why a first significant characteristic of this invention consists in proposing to configure the net so that it is substantially in the form of a crown or collar, thus delimiting straight away a transverse orifice, the cross section of which may be adapted to that of the perforator in the case of an application of the invention to the heat fusing of a branch connector and a main pipe. In this manner, the net thus made up with its predefined orifice will have, once and for all, an electrical continuity throughout its network. This net will preferably be made up by a single wire which may have one or more strands joined together, the said wire being advantageously protected by an outer sheath.

Moreover, a "cold zone", (that is to say a zone which is unheated or hardly heated during the passing of the current), will naturally be created at the location of the orifice thus made in the net which will be easily able to be given the desired shape with external and internal diameters which can be easily adjusted, because of the flexibility of the net and the quite easily deformable character of its meshes, especially enabling such a net to be adapted to applications other than the heat fusing of a branch connector.

Thus, it is possible in particular to envisage applying the invention to the welding of two tubes end to end, by replacing the currently used heating means (in general a heating mirror) by the resistance of the invention, the "central" orifice of which, of course, will preferably have been preadapted to the internal and external diameters of the main pipes to be connected.

Moreover, the invention, in addition to the resistive net itself, also relates to the use of such a net for the electric welding either of two tubes end to end or of a main pipe and a branch connector, the invention furthermore relating very naturally to the production of an assembly comprising either two main pipes welded end to end or a pipe and a branch connector, the invention also applying to the production of such a connector, insofar as, of course, the latter will comprise the annular net-configured resistance of the invention.

A more detailed description of this invention will now be given, with reference for this to the attached drawings given solely by way of non-limiting exemplary embodiments and in which drawings:

BRIEF DESCRIPTION OF THE FIGURES

The abovementioned FIGS. 1 and 2 respectively show an application and an embodiment of a resistive net as used in the prior art.

DETAILED DESCRIPTION OF THE INVENTION

Figure 3:
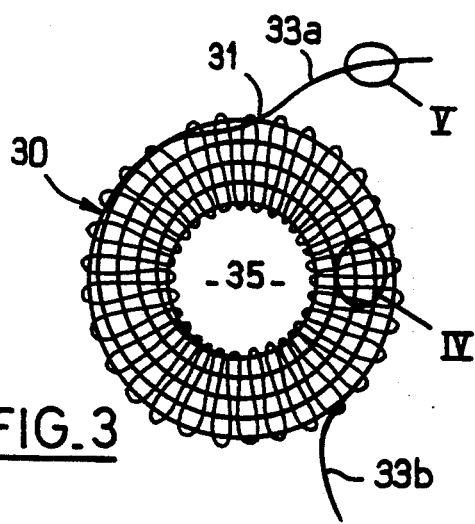
FIG. 3 shows a first embodiment of a resistive net according to the invention.

First of all, in FIG. 3 there may be seen, clearly illustrated, the collar- or ring-configured shape of the resistive net of the invention, here designated in its entirety by 30.

In this case, this network is made up of a single electrically-conducting wire 31 extending continuously between its two ends 33a, 33b, this wire having as it were "knitted", as a sock would be knitted for example, so as to produce this flattened ring- or collar-configured shape delimiting a penetrating orifice 35.

Figure 4:
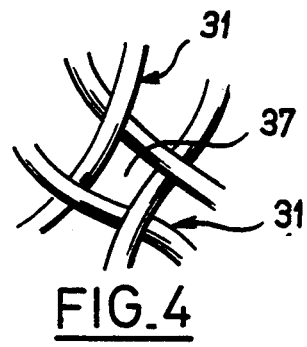
FIG. 4 illustrates, in an enlarged localized view, a possible make-up of a few meshes of the net of FIG. 3, according to the detail designated by IV in this Figure.

In FIG. 4 it may be seen that the wire may, for its mechanical strength, be especially such that the lengths of the wire will overlap or be interlaced, for example, over and under at each intersection, thus progressively delimiting a series of meshes, such as 37, of suitable dimensions.

However, it could also be imagined that, at each crossing, the wire has loops or knots.

Figures 5, 6:
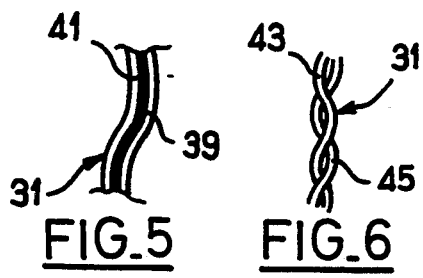
FIG. 5 illustrates, in section, the construction of the wire of the structure of this same FIG. 3, according to the detail designated by V in this Figure.
FIG. 6 illustrates an alternative embodiment of the wire of FIG. 5, FIGS. 7A, 7B and 7C on the one hand, and FIGS. 8A to 8C on the other hand, show, in a few steps, two possible principles for producing the net-configured structure of FIG. 3, FIGS. 9 and 10 show two variants of such a net.

Taking into account the preferential (but non-exclusive) application of the network of the invention to the field of electric welding, the wire 31 could be produced from a single electrically-conducting strand, for example, made of copper, designated by 39 in FIG. 5, and coated with a sheath or film 41 made from a material which is thermally conducting but electrically insulating, in which the strand may, for example, enable the sheath to keep its characteristics up to a temperature of the order of 300° to 350° C.

The sheath will thus melt or soften when the optimum heating temperature of the resistance, which should lead to a good welding quality between the elements, that are reached. Provision may especially be made to produce this sheath from a polymer material, preferably a thermoplastic or thermosetting polymer material, and, for example, from a polyesterimide-based mixture.

However, instead of such a wire, sheathed and having a single conducting strand, it would also be possible to use a wire having multiple strands, designated by 43, 45 in FIG. 6, and which are, for example, wound on themselves or braided so that the net is overall still produced only by a single continuous wire, the number of strands making up this wire finally depending on the chosen application.

Figure 9:
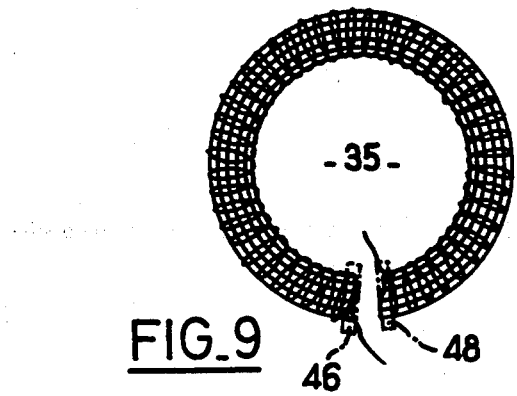

It should be clear that, if the wire is made up of a plurality of braided strands, it will be possible either to provide an insulating sheath for each strand or to coat all the insulated strands in one and the same sheath. It would also be possible to envisage, as an alternative, a plurality of insulated strands side by side in the form of a ribbon (variant not shown), or even to produce a net with a plurality of wires (even if this version seems a priori less advantageous taking into account the problems which could arise with connecting the wires to the external supply terminals or leads, possibly requiring the presence of terminal strips joining up the wires at their ends, such strips having been shown diagrammatically in phantom lines 46, 48 in the version of FIG. 9).

Figure 7A:
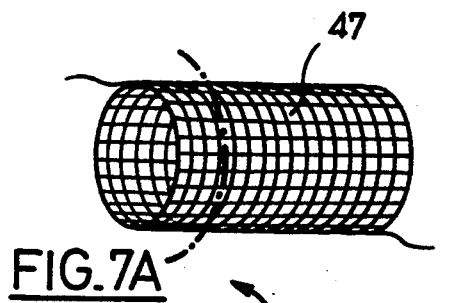
Figure 7B:
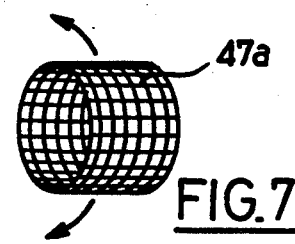
Figure 7C:
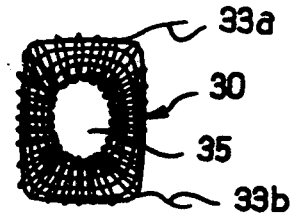

Attempts have been made to show, in FIGS. 7A to 7C, a first possibility for producing the collar-shaped net of the invention.

In this case, the starting point is a substantially cylindrical tubular net 47 (having a single wire, of course) as is found in, for example, an illustration in the first Figure of the abovementioned publication FR-A-2,654,978, it being possible for such a net, for example, to have been "knitted" around a cylindrical mandrel.

Once such a net is to hand, it will be cut to length, so as to obtain a length of a tubular cylinder such as designated by 47a in FIG. 7B.

It will then suffice to flatten this length by pulling its edges towards the outside, as indicated by the arrows of FIG. 7B, until the flattened-collar shape of FIG. 7C is obtained where the net 30 of FIG. 3 may be recognized.

It should be clear that although a collar thus formed has something in common with a more or less flat ring or crown, it will not necessarily be internally and externally limited by two concentric circles.

As a matter of fact, everything will depend on the extensible character of the meshes of the net and on the magnitude and locations where the net will be deformed in order to flatten it.

Figure 12:
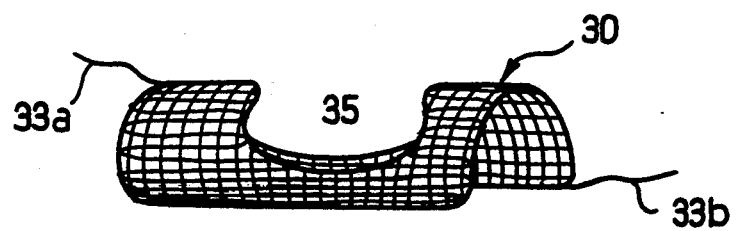
FIG. 12 shows, in perspective, the curved configuration of the net when it is desired to use it on a branch connector, FIG. 13, moreover, illustrating such an application example.

Moreover, it is for this reason that the net has been shown in FIG. 7C with its outer edges substantially in the form of a square, this shape again having been adopted moreover in FIG. 12, the central orifice 35 having, on the other hand, been kept substantially circular in this example.

Figure 8A:
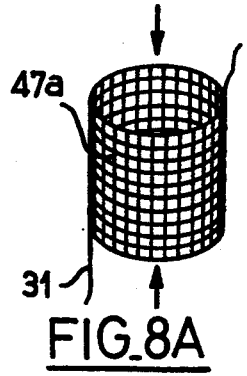
Figure 8B:
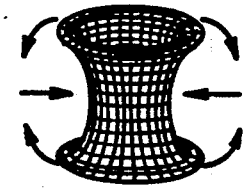
Figure 8C:
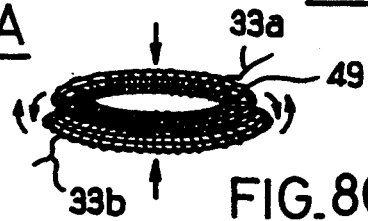

FIGS. 8A to 8C represent another embodiment.

In this case, still starting from a length of cylinder 47a, using a turning-inside-out movement, an outward deformation is made of the two opposite ends of the length of cylinder which is compressed on itself towards its central zone in the manner of a concertina until a collar in the form of a double crown, designated by 49 in FIG. 8C, is obtained.

With such embodiments, shapes having a completely closed contour are necessarily obtained.

Figure 10:
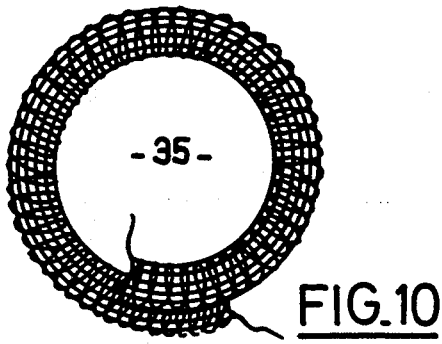

In order to approximate such shapes, the starting point could also be a net in the form of a band of a given length and width, this band then being rolled up on itself, by deforming to a greater or lesser extent one of its borders until the flattened-ring equivalent thus made up has been partially (FIG. 9) or completely closed up, possibly with overlap (FIG. 10), whilst still preserving inside this ring the desired orifice 35.

Figure 11:
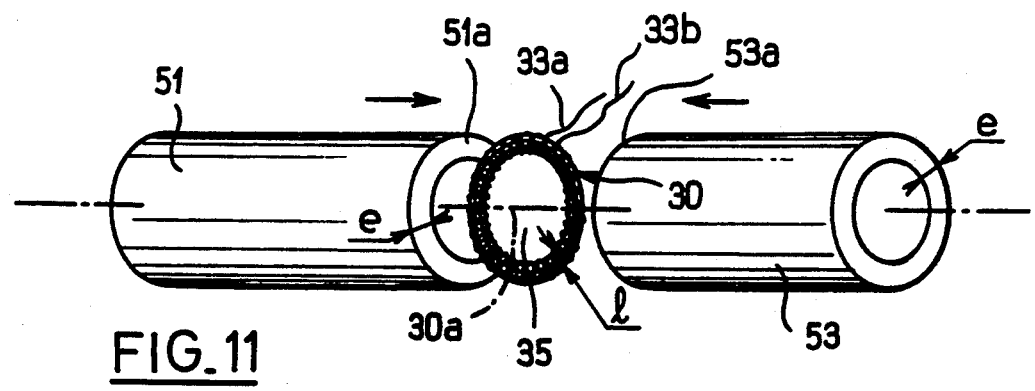
FIG. 11 illustrates diagrammatically the application principle of the net of the invention within the framework of the welding of two tubes end to end.

An application example of the collar-shaped heating net of the invention has been shown in FIG. 11 for the case of the welding, end to end, of two tubes 51, 53 which are coaxial and have substantially the same diameter.

Especially in a gas-related application, the tubes will advantageously be produced from a heat-fusing or thermoplastic material, such as polyethylene.

In the known technique, the coaxial welding of two such tubes is normally effected with the aid of a "heating mirror".

The two facing ends of tubes to be joined are placed between the jaws of a machine which straightens out their facing end faces, perpendicularly to their axis, aligns these ends and then moves the said tubes closer together or further apart.

Such a machine includes a heating tool (often therefore called a mirror) which supplies the thermal energy necessary for the welding.

After having aligned the two tubes and straightened out their ends with the aid of a tool called a "plane", the operator interposes between them the mirror in question, the faces of which have a regulated temperature, for example of the order of 200° to 300° C.

The ends of the tubes are then applied to the faces of the mirror with a certain pressure and for a time sufficient for the plastic material of these tubes to be heated and to become fluidized until two beads are formed.

The operator then rapidly moves the two tubes apart, withdraws the mirror, moves the tube ends closer together and presses them against each other, holding them thus until they cool down.

During this time, the two beads finish being formed.

Given that numerous factors come into play in practice which make a good weld tricky to produce, the invention proposes to replace the mirror machine by one of the embodiments of the collar-shaped resistance imagined.

Thus, in FIG. 11, the resistive collar 30 has been interposed between the two tubes 51, 53 to be welded so that its crown axis 30a is substantially coincident with the common axis of the two tubes.

In practice, the width l of the crown 30 will be at least slightly less than the thickness e of the tubes, so as to prevent said collar from projecting outwards or inwards from the surface of these tubes once these have been welded to each other.

In order to carry out the welding, it may be advisable, after having straightened out the facing faces 51a, 53a of the tubes, to press the net 30 up against the face 51a for example, thereby making the orifice 35 of the net coincide with that of the tube, the two diameters substantially coinciding.

After this, the tubes will be moved closer to each other coaxially until the net 30 is intimately gripped between them and the net will be supplied electrically via its wire ends 33a, 33b which are then correctly connected to the suitable power source, such as a direct-current generator.

The two proximal ends of the tubes, heated up until melting, will interlace their material through the meshes of the net, thus ensuring the desired welding after stopping of the heating, and then cooling down.

Figure 13:
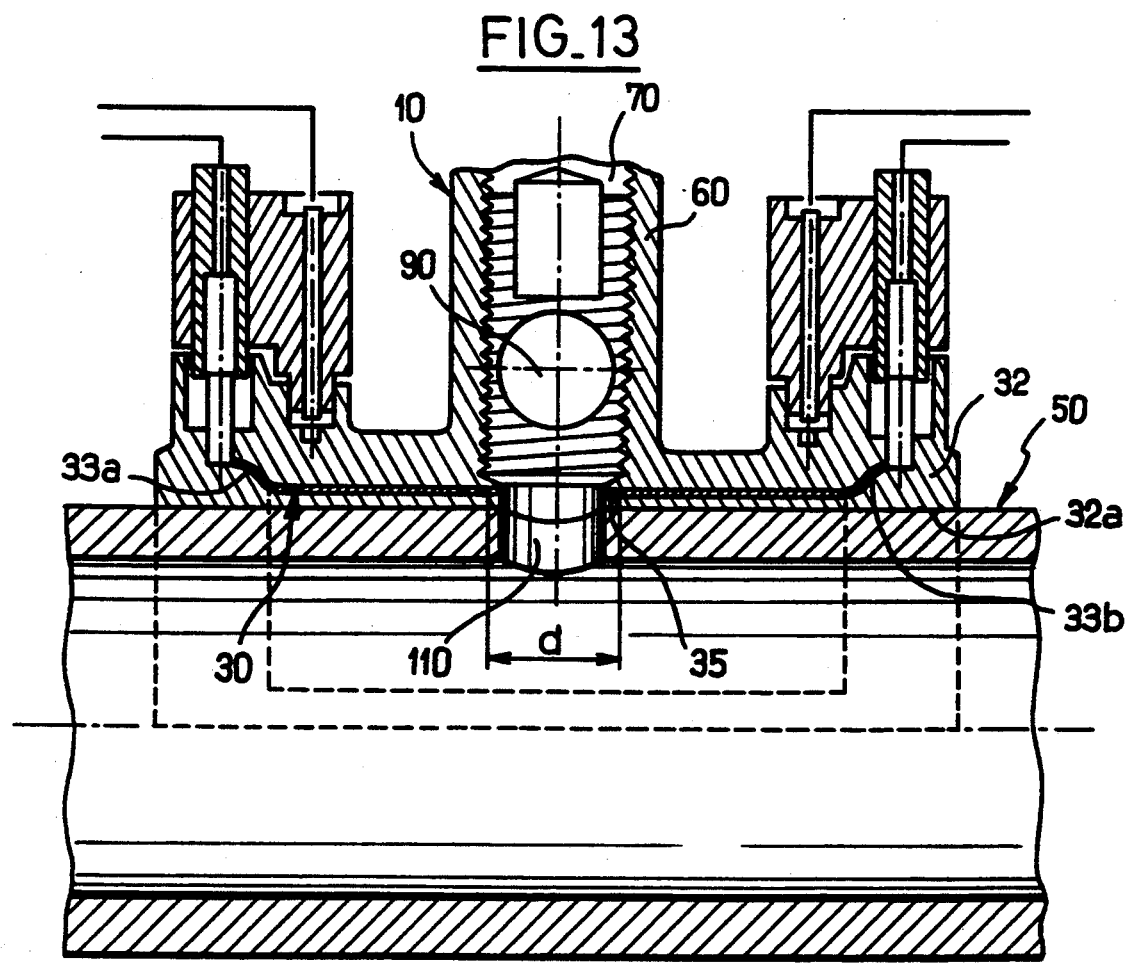

A second preferential application of the invention, to the electric welding of a main pipe and a branch connector (of the general type already described with reference to FIG. 1), is depicted in FIGS. 12 and 13.

Thus, FIG. 12 shows in perspective the collar-shaped net of the invention, which, for example, may correspond to the substantially plane collar 30 of FIG. 7C which has been bent or curved so that it has a substantially semi-cylindrical shape, with its transverse orifice 35 in the upper central part.

Of course, the representation of FIG. 13, where such a curved net is seen in place in the saddle-shaped part 32 of the branch connector 10, is very similar, in its illustration, to FIG. 1, especially as in both Figures the transverse piercing (respectively 11 and 110) of the main pipe has been effected. It will be noticed that the net 30 is arranged embedded in the immediate vicinity of the concave inner straddling surface of the saddle, with its cylindrical axis parallel to that of this saddle and its orifice 35 axis coincident with that of the passageway 70 of the shaft 60 and of the piercing 110.

As a matter of fact, what essentially differentiates the two Figures is, of course, that in the case of FIG. 13 the net 30 had its orifice 35 facing the passageway 70 of the said shaft 60, straight away (before piercing), the cross section d of this orifice having been chosen, of course, preferably at least slightly greater than the cross section of the piercing head of the perforator.

In this manner, the center of the heating ring will enable the perforator to pass freely, and a "cold" zone will thus be created around the communication zone of the elements. And it will be easier to ensure the tightness of the welding between the branch connector and the main pipe 50.

Of course, it would have been possible to use the double-crown collar of FIG. 8C, which could further increase the uniformity of the heating.

It should be clear that the invention would remain applicable in an application where the collar-shaped net would be disposed not in the branch connector but between the latter and the main pipe.

We claim:

1. A welding connection assembly comprising:
a meshed resistance defining an interlaced wire network having at least one continuous electrical conductor wire ending at opposite ends in input terminals, the resistance having electrical continuity across its entire surface;
the resistance further having an annular flat ring shape with a central hole formed therein;
wherein the terminals are adapted to be connected to an electrical power source; and further wherein
the resistance is adapted to be disposed close to a front surface of respective first and second elements made of heat-fusing plastic, for fusing said elements in the vicinity of their respective front surfaces, thereby causing welding between the first and second elements.

2. The welding connection assembly as claimed in claim 1, wherein the resistance is made up of a single wire comprising a single strand having an interlaced configuration.

3. The welding connection assembly as claimed in claim 1, wherein the resistance is made up of a single wire comprising a plurality of strands, said wire having an interlaced configuration.

4. The welding connection assembly as claimed in claim 1, wherein the wire network of the resistance is covered with a layer made of material which is thermally conducting and electrically insulating up to a temperature from about 300° to 350° C.

5. The welding connection assembly as claimed in claim 1, wherein said resistance is produced from a tubular network substantially in the form of a length of cylinder deformed flat, to obtain the ring shape.

6. The welding connection assembly as claimed in claim 1, wherein the resistance is produced with a meshed band substantially closed on itself to be substantially flat, while preserving a central orifice, in order to have the ring shape.

7. The welding connection assembly as claimed in claim 1, wherein
the resistance has an axis passing through the hole,
the first and second elements including two tubes,
the tubes disposed coaxially, end to end, and
the resistance interposed between the ends of the tubes, the axis of the resistance extending substantially parallel to an axis of the tubes, for axially welding confronting ends of the tubes.

8. The welding connection assembly as claimed in claim 1, wherein:
the first element is a main pipe having an axis and an outer rounded surface,
the second element comprises a saddle for connecting the main pipe to a branch pipe,
the saddle at least partially covering the perimeter of the outer surface of the main pipe and having a hole formed therethrough, the hole having an axis transverse to the axis of the main pipe, and
the resistance being substantially axially disposed around the hole of the saddle, the diameter of the hole of the resistance being at least slightly larger than that of the hole of the saddle.

9. The welding connection assembly as claimed in claim 1, wherein:
the first element is a main pipe having an axis and an outer rounded surface,
the second element includes a saddle for connecting the main pipe to a branch pipe,
said saddle covering at least partially the perimeter of said outer surface of the main pipe and having a hole therethrough, said hole having an axis transverse to the axis of said main pipe and,
the resistance is interposed between the saddle and the outer surface of the main pipe, the central hole thereof being disposed substantially coaxial with the hole of the saddle and the diameter of the central hole being at least slightly larger than that of the hole of the saddle.

10. The welding connection assembly as claimed in claim 1, wherein:
the first element is a main pipe having an axis and an outer rounded surface,
the second element comprises a saddle for connecting the main pipe to a branch pipe,
the saddle at least partially covering the perimeter of the outer surface of the main pipe and having a hole forward therethrough, the hole having an axis transverse to the axis of the main pipe, and
the annular resistance being substantially axially disposed around the hole of the saddle, the diameter of the hole of the resistance being at least slightly larger than that of the hole of the saddle and of a corresponding hole to be coaxially opened through the outer surface of the main pipe for communication with the branch pipe.

11. A welding connection assembly comprising:

a first and a second element of heat-fusing plastic, said first element having a front surface for the connection thereof to a corresponding front surface of the second element, a resistance disposed close to said front surfaces of said first and second elements for fusing said heat-fusing plastic at said front surfaces, thereby causing welding between said first and second elements, said resistance forming a network and having two opposite terminals for connecting said resistance to an electrical power source, wherein the improvement comprises:

said network resistance having an annular flat shape with a central hole therethrough, and said network comprising at least one electrical conductor extending without discontinuity between said two opposite terminals thereof, whereby said resistance has an electrical continuity all along said network, and further wherein said resistance is produced from a tubular network substantially in the form of a cylinder folded over itself in order to have a double thickness, and a ring shape.

* * * * *